April 3, 1934.   C. W. J. HEDBERG   1,953,405
ELECTRICAL PRECIPITATION
Filed Jan. 4, 1932
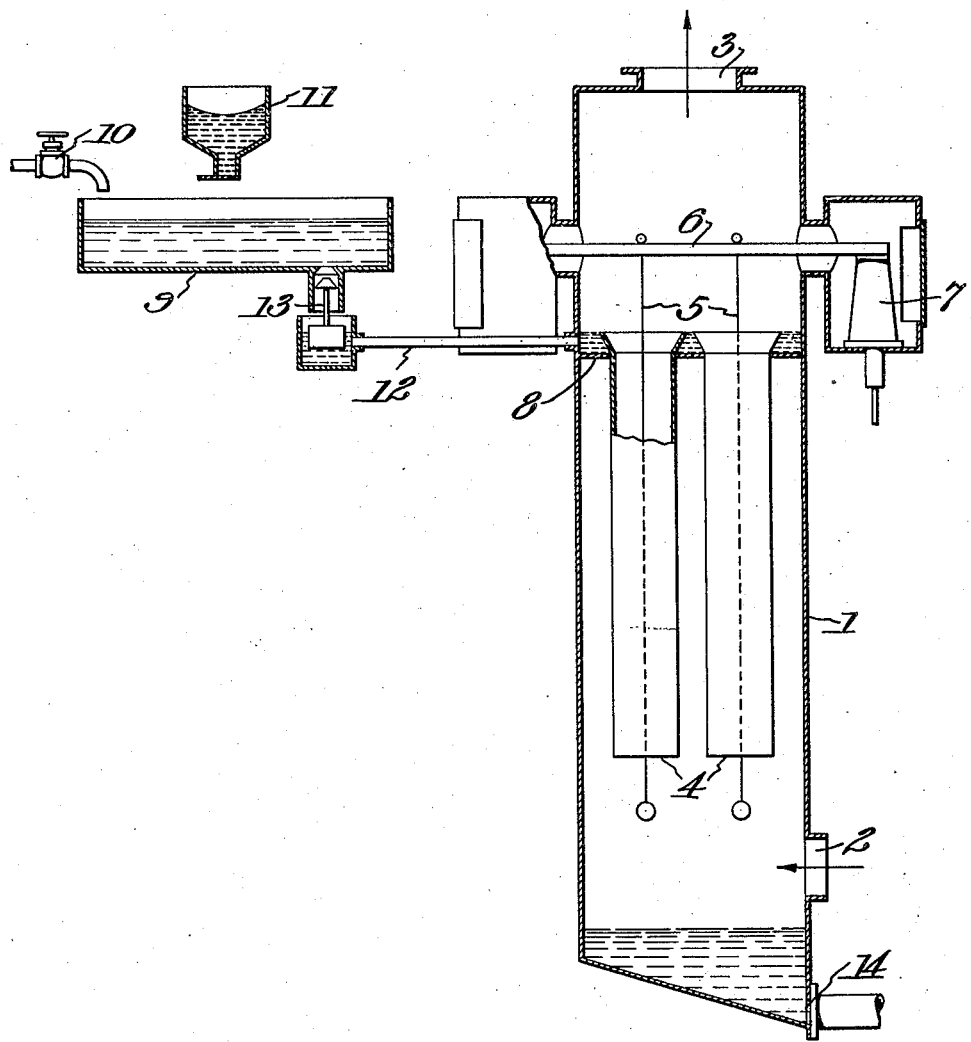
Inventor:
Carl W. J. Hedberg
By Byrnes, Townsend & Potter
Attorneys.

Patented Apr. 3, 1934

1,953,405

UNITED STATES PATENT OFFICE 1,953,405

ELECTRICAL PRECIPITATION

Carl W. J. Hedberg, Bound Brook, N. J., assignor to Research Corporation, New York, N. Y., a corporation of New York Application January 4, 1932, Serial No. 584,722

2 Claims. (Cl. 183—7)

This invention relates to electrical precipitation and particularly to improvements in the operation of precipitators of the film electrode type.

In the cleaning of gases which carry suspended particles that build up on the collecting electrodes in the form of hair-like tendrils, the localization of the electrical field which results from such formations not only reduces the capacity of the precipitator for a given efficiency of removal, but also reduces the absolute efficiency of removal irrespective of the volume of gas handled. It has been proposed to prevent this formation of tree-like or furry deposits by flowing a film of water over the entire surface of the collecting electrode. Precipitators operated in this manner have been designated as "film electrode" or "wetted electrode" precipitators, and have given quite satisfactory operation in the cleaning of some gases, particularly in localities where the cost of wash water is relatively low and the disposal of the mixture of water and deposited material does not involve high expense.

The film electrode type of precipitator has been, however, of only limited utility and it has been either impossible or impractical to use this system of electrical precipitation in many instances where the operating efficiency would be greatly improved if a practically continuous cleaning of the collecting electrodes could be effected.

The solid material carried by some gases is of such a nature that it resists wetting by the water and furry deposits tend to build up even though a film of water is flowing down the collecting electrode. While this tendency may be obviated by using larger quantities of water, other considerations may limit the quantity of water which can be used. Aside from any questions as to the increased cost of supplying additional water, and the increased difficulty or expense in the disposal of the slime or sludge produced in the precipitator, there is the problem of maintaining the desired potential difference between the electrode systems when large quantities of water are passed through the precipitator. Even though the expense incident to the use of relatively large quantities of wash water is not prohibitive, it may be impossible to use sufficient water to prevent the growth of deposits on the collecting electrodes, since an excessive drop or continuous flow of water from the collecting electrode may cause arcing, which in itself reduces the efficiency and capacity of the precipitator.

An object of the invention is to provide an improved method of operating electrical precipitators of the film electrode type. A further object is to provide a method of increasing the efficiency of film electrode precipitators by reducing the quantity of water required to prevent the growth of deposits on the collecting electrode. A further object is to provide a method of facilitating the wetting of the collecting electrode and the deposited material in film electrode precipitators.

These and other objects of the invention will be apparent from the following specification when taken with the accompanying drawing in which the single figure is a central vertical section of one film electrode precipitator to which the invention may be applied.

In the drawing, the numeral 1 identifies the casing of an up-draft precipitator which has a lower inlet 2 for raw gas and an outlet 3 at its upper end for the cleaned gas, the direction of gas flow being indicated by the arrows. The collecting electrodes comprise a plurality of pipes 4, and the discharge electrode system includes filamentary electrodes 5 located at the axis of each collecting electrode pipe 4, the discharge electrodes being suspended from a high tension framework 6 which is mounted on insulators 7.

The collecting electrodes 4 are mounted on and supported by an upper header 8 which extends across the casing 1 and provides a reservoir for holding the wash water that flows down the inner surfaces of the pipes 4. The wash water is supplied from a tank 9 which receives water from a tap 10 and a wetting agent, such as sodium silicate or a sulfonated vegetable oil, from a container 11. The rate of flow of the wash solution to the reservoir at the top of the precipitator casing may be controlled manually by a valve in the supply pipe 12, or as shown by float valve 13 such as used in carbureters and other constant level systems.

An outlet or drain 14 is provided at the bottom of casing 1, and the sludge or slime which drops from the collecting electrodes 4 may be drawn off, either continuously or intermittently, through this drain.

Before placing the precipitator in operation the pipes 4 are carefully cleaned to remove all scale and rust, together with any oil films, by washing and scrubbing with acid and/or hot alkali solutions. By thus eliminating any areas which tend to repel wetting by the wash liquid, the quantity of liquid required to maintain a continuously flowing film over the entire collecting electrode surface is very materially reduced. For example, it has been found that a suitable wetting film can be obtained on an electrode having a total surface of 24 square feet by flowing over it an amount of liquid equivalent to not over 2 pounds, or approximately 1 quart, per minute.

The use of a wetting agent in the wash water not only facilitates the wetting of the entire electrode surface, but causes dispersion of the solid particles thrown to the collecting electrodes and prevents them from flocculating or from firmly attaching themselves to the electrodes. Any of these loosely attached particles which do not slide off as rapidly as deposited, but remain as a slurry, can be readily and completely removed by an occasional heavy flushing of the collecting surface. In general, substances which increase the ability of water to wet the surfaces of solids are advantageously used in this process. Sodium silicate and sulfonated vegetable oils have been found to be particularly suitable for facilitating the wetting of the materials ordinarily used for collecting electrodes, and it has been found that only relatively small concentrations of the wetting agents are necessary to effect the desired results.

In many problems, for instance in the secondary cleaning of iron blast furnace gases, satisfactory results have been obtained when the wash water contained 0.025 percent by weight of 33.5° Bé. silicate of soda.

I claim:

1. An improvement in the separation of solid particles from gases by passing the gases through an electrical precipitator of the film electrode type which comprises supplying to the collecting electrodes wash water containing sodium silicate in an amount sufficient to completely wet the surface of said electrodes but not substantially in excess thereof.

2. In the operation of an electrical precipitator of the film electrode type, the improvement which comprises dissolving in the wash water sodium silicate whereby the quantity of water required to prevent the formation of detrimental growths of deposited solid matter is substantially reduced.

CARL W. J. HEDBERG.